US007660797B2

(12) United States Patent
Marinescu et al.

(10) Patent No.: US 7,660,797 B2
(45) Date of Patent: Feb. 9, 2010

(54) SCANNING DATA IN AN ACCESS RESTRICTED FILE FOR MALWARE

(75) Inventors: Adrian M Marinescu, Sammamish, WA (US); George C Chicioreanu, Redmond, WA (US); Marius Gheorghe Gheorghescu, Redmond, WA (US); Scott A Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 487 days.

(21) Appl. No.: 11/139,409

(22) Filed: May 27, 2005

(65) Prior Publication Data

US 2006/0272021 A1 Nov. 30, 2006

(51) Int. Cl.
G06F 7/00 (2006.01)
G06F 17/30 (2006.01)
G06F 11/00 (2006.01)
G06F 12/14 (2006.01)
G06F 12/16 (2006.01)
G08B 23/00 (2006.01)

(52) U.S. Cl. ............................................ 707/9; 726/24
(58) Field of Classification Search ........................ None
See application file for complete search history.

(56) References Cited

U.S. PATENT DOCUMENTS 5,584,023 A * 12/1996 Hsu ............................. 707/204
5,740,370 A * 4/1998 Battersby et al. ............. 709/219
6,766,458 B1 * 7/2004 Harris et al. .................... 726/6
6,779,117 B1 * 8/2004 Wells ............................ 726/24
6,856,993 B1 * 2/2005 Verma et al. ................. 707/101
7,409,389 B2 * 8/2008 Ananthanarayanan et al. . 707/8
2002/0111133 A1 * 8/2002 Wittkotter ...................... 455/1
2003/0110392 A1 * 6/2003 Aucsmith et al. ............ 713/200
2005/0099395 A1 * 5/2005 Marsden et al. .............. 345/168
2005/0149525 A1 * 7/2005 Verma et al. .................... 707/8
2005/0183143 A1 * 8/2005 Anderholm et al. ........... 726/22

(Continued)

FOREIGN PATENT DOCUMENTS

EP 606771 A2 * 7/1994
EP 1655682 A2 * 5/2006

OTHER PUBLICATIONS

Norton, "Norton System Works 2002", Aug. 13, 2001, Symantec, Professional Ed., p. 23, 31, 52, 59, 65, 81, 113, 126, 129, 140,151, 221, 222-226.*

(Continued)

Primary Examiner—Hosain T Alam
Assistant Examiner—Shew-Fen Lin
(74) Attorney, Agent, or Firm—Workman Nydegger

(57) ABSTRACT

The present invention is directed toward a system, method, and computer-readable medium that scan a file for malware that maintains a restrictive access attribute that limits access to the file. In accordance with one aspect of the present invention, a method for performing a scan for malware is provided when antivirus software on a computer encounters a file with a restrictive access attribute that prevents the file from being scanned. More specifically, the method includes identifying the restrictive access attribute that limits access to the file; bypassing the restrictive access attribute to access data in the file; and using a scan engine to scan the data in the file for malware.

15 Claims, 5 Drawing Sheets

U.S. PATENT DOCUMENTS

| | | | |
|---|---|---|---|
| 2006/0021032 A1* | 1/2006 | Challener et al. | 726/22 |
| 2006/0095965 A1* | 5/2006 | Phillips et al. | 726/22 |
| 2006/0218635 A1* | 9/2006 | Kramer et al. | 726/22 |
| 2006/0259487 A1* | 11/2006 | Havens et al. | 707/9 |
| 2006/0294391 A1* | 12/2006 | Wu | 713/182 |
| 2007/0174916 A1* | 7/2007 | Ching | 726/24 |
| 2007/0294744 A1* | 12/2007 | Alessio et al. | 726/1 |

OTHER PUBLICATIONS

Kim et al., "The design and implementation of tripwire, a file system integrity checker", Nov. 1994, Proceedings of the 2nd ACM Conference on Computer and Communications Security CCS'94, ACM Press, p. 18-29.* support.microsoft.com, "Windows Explorer does not support file management using Principle of Least Privilege", Apr. 21, 2004, Microsoft Help and Support Site, p. 1-2.*

Mirapaul, "Newswatch: Culture; Crashing PC's in Frankfurt, The Art World's New Bad Boys", May 30, 2002, NYTimes.com, Retrieved Feb. 6, 2008, p. 1.*

Docherty et al, "Macro Attacks: What Next After Melissa?", 1999, Computers & Security, vol. 18, No. 5, p. 391-395, <Retrieved from Science Direct Apr. 6, 2009>.*

Stoneburner, "COTS Security Protection Profile—Operating Systems (CSPP-OS)", Apr. 2003, US Department of Commerce, Version 1.0, 171 pages, <Retrieved from internet Apr. 6, 2009>.*

* cited by examiner

SCANNING DATA IN AN ACCESS RESTRICTED FILE FOR MALWARE

FIELD OF THE INVENTION

The present invention relates to computers and, more particularly, to protecting a computer from malware that employs file access restrictions to avoid being detected by antivirus software.

BACKGROUND OF THE INVENTION

As more and more computers and other computing devices are interconnected through various networks such as the Internet, computer security has become increasingly more important, particularly from invasions or attacks delivered over a network or over an information stream. As those skilled in the art will recognize, these attacks come in many different forms including, but certainly not limited to, computer viruses, computer worms, system component replacements, denial of service attacks, even misuse/abuse of legitimate computer system features—all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

When a computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer is used to infect other systems.

FIG. 1 is a pictorial diagram illustrating an exemplary networking environment 100 over which a computer malware is commonly distributed. As shown in FIG. 1, the typical exemplary networking environment 100 includes a plurality of computers 102-108, all inter-connected via a communication network 110, such as an intranet or via a larger communication network including the global TCP/IP network commonly referred to as the Internet. For whatever reason, a malicious party on a computer connected to the network 110, such as computer 102, develops a computer malware 112 and releases it on the network. The released computer malware 112 is received by and infects one or more computers, such as computer 104 as indicated by arrow 114. As is typical with many computer malware, once infected, computer 104 is used to infect other computers, such as computer 106 as indicated by arrow 116 that, in turn, infects yet other computers, such as computer 108 as indicated by arrow 118. It should be appreciated that the malware 112 may be directed to any one of the computers 104-108 as a result of a request initiated by the computer 102. Clearly, due to the speed and reach of the modern computer networks, a computer malware 112 can "grow" at an exponential rate and quickly disrupt communications between organizations and people.

A traditional defense against computer malware, and particularly computer viruses and worms, is antivirus software. Generally described, antivirus software scans data, looking for identifiable patterns associated with known computer malware. Frequently this is done by matching patterns within the data to what is referred to as a "signature" of the malware.

If a malware signature is identified, the antivirus software takes appropriate action, such as deleting the malware/infected file or removing the malware from an infected file. One of the core deficiencies in this malware detection model is that some malware may employ certain techniques to avoid being scanned for malware. Thus, computers remain susceptible to malware, even if antivirus software is installed on the computer. For example, a malware may use mechanisms available from an operating system to "lock" a file or otherwise restrict the ability of other programs executing on the computer to access data in the file. In this instance, data in a file may not be scanned for antivirus software before being "executed" on the computer.

Sadly, when a computer is exposed to the effects of malware, the infected computer costs the computer's owner substantial amounts of money to "disinfect" and repair. This cost can be enormous when dealing with large corporations or entities that may have thousands or hundreds of thousands of devices attached to a network. Such a cost is further amplified by the possibility that the malware may tamper with or destroy user data, which may be extremely difficult or impossible to remedy.

SUMMARY OF THE INVENTION

The foregoing problems with the state of the prior art are overcome by the principles of the present invention, which are directed toward a system, method, and computer-readable for bypassing a restrictive access attribute that limits access to a file in order to scan the file for malware.

In accordance with one aspect of the present invention, a method that performs a scan for malware is provided when antivirus software on a computer encounters a file with a restrictive access attribute. More specifically, the method includes identifying the restrictive access attribute that limits access to the file; bypassing the restrictive access attribute to access data in the file; and using a scan engine to scan the data for malware.

Another aspect of the present invention is a method for bypassing one or more restrictive access attributes that prevent antivirus software from scanning a file for malware. In one embodiment of the method, logic is provided that determines how to access the file depending on the restrictive access attribute imposed on the file. In this embodiment, when the operating system on the computer generates an error message after an initial attempt to access the file, the method identifies the type of error message received. If the error message indicates that the initial attempt to access the file is an "access violation" and the file is not encrypted, a backup service is used to access data in the file. Alternatively, if the attempt to access the file results in an access violation and the file is encrypted, steps for "impersonating" a user who has the rights to access the file are employed. If the initial attempt to access the file results in a "sharing violation" and the file is currently open, a duplicate file handle is created to access the file. However, if the initial attempts to access the file result in a sharing violation and the file is not open, data in the file is accessed by assembling clusters of the data directly from the hardware device that stores the data.

In still another aspect of the present invention, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention provides a system, method, and computer-readable medium for bypassing a restrictive access attribute that limits access to a file in order to scan the file for malware. Those skilled in the art and others will recognize that, increasingly, operating systems are designed to accommodate multiple users who access computer resources from distributed locations over a network connection. In order to accommodate distributed computer systems with multiple users, access control mechanisms for protecting computer resources have been developed. For example, in some operating systems, access to a file may be restricted to a user or a group of users. When stored on a hardware device, the file is encrypted to prevent unauthorized users from accessing the file. However, malware authors may use legitimate access control mechanisms in order to prevent antivirus software from scanning one or more files for malware. The present invention is directed to overcoming these limitations in the prior art to protect a computer from malware. The following description first provides an overview of a software system in which the present invention may be implemented. Then a method that bypasses a restrictive access attribute imposed on a file in order to scan the file for malware is described. The illustrative examples provided herein are not intended to be exhaustive or to limit the invention to the precise forms disclosed. Similarly, any steps described herein may be interchangeable with other steps or combinations of steps in order to achieve the same result.

Now with reference to FIG. 2, a computer 200 that maintains a hierarchical structure, typical in the prior art, will be described. The computer 200 may be any one of a variety of devices including, but not limited to, personal computing devices, server-based computing devices, personal digital assistants, cellular telephones, other electronic devices having some type of memory, and the like. For ease of illustration and because they are not important for an understanding of the present invention, FIG. 2 does not show the typical components of many computers such as a keyboard, a mouse, a printer or other I/O devices, a display, etc. However, the computer 200 illustrated in FIG. 2 includes a hardware platform 202, a host operating system 204, and an application platform 206 on which programs, including potential malware, are executed. For ease of illustration and because they are not important to an understanding of the present invention, FIG. 2 is a highly simplified example that does not show many of the components that would be included in the computer 200, such as a central processing unit, memory, hard drive, etc.

Figure 1:
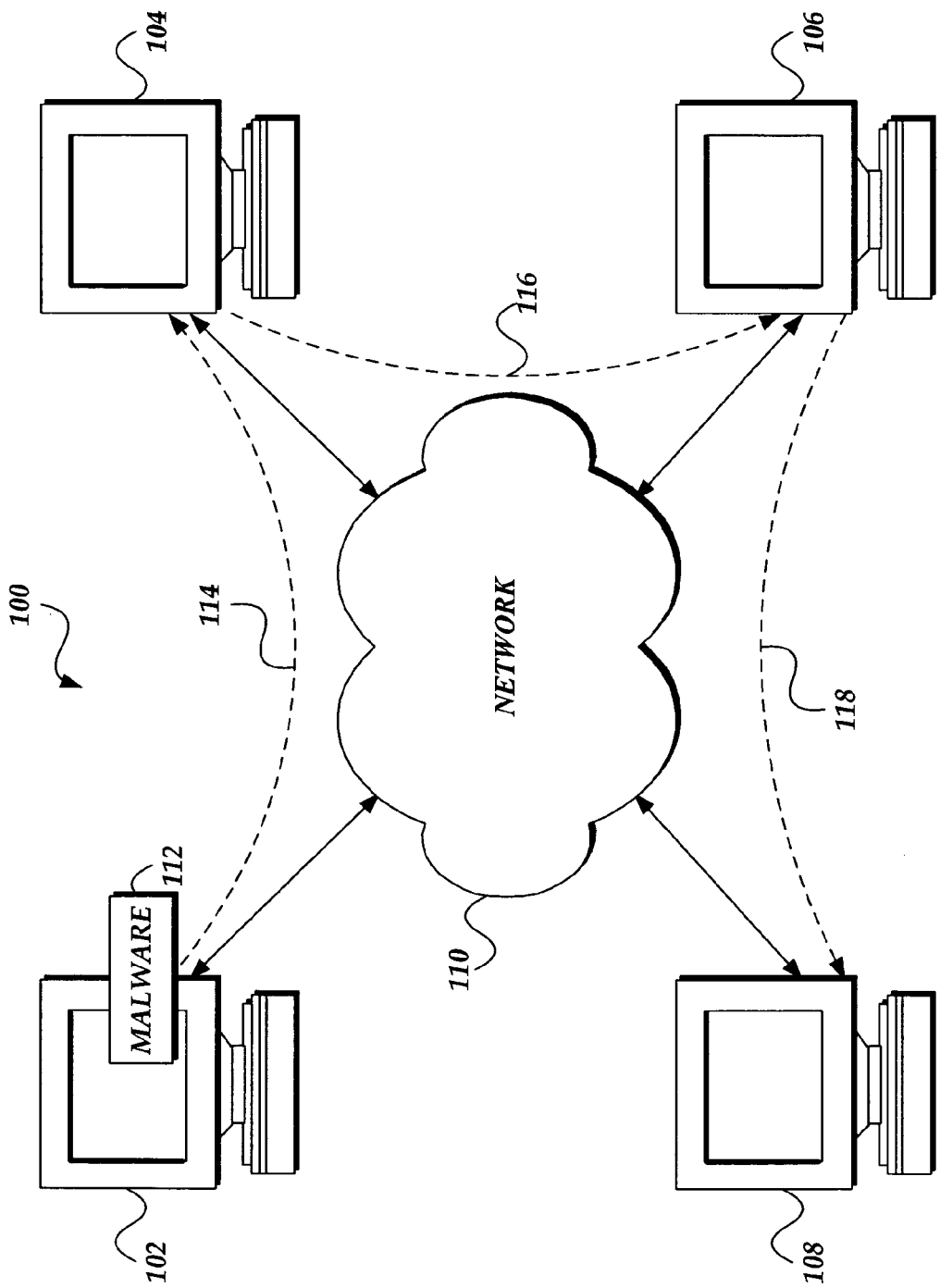
FIG. 1 is a pictorial diagram illustrating a conventional networking environment over which malware is commonly distributed, in accordance with the prior art.
Figure 2:
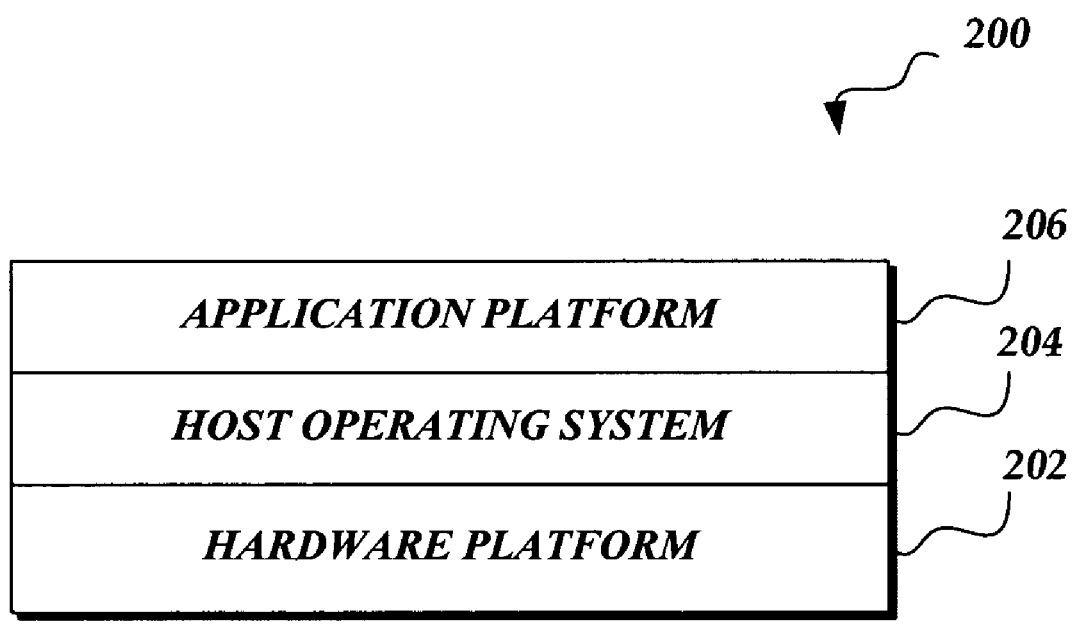
FIG. 2 is a pictorial diagram that illustrates the hierarchical structure that exists between system components on a computer, in accordance with the prior art.

As shown in FIG. 2, components of the computer 200 are layered with the hardware platform 202 on the bottom layer and application platform 206 on the top layer. The layering of FIG. 2 illustrates that the present invention will typically be implemented in a hierarchical environment in which each layer of the computer 200 is dependent on systems in lower layers. More specifically, programs run on top of the application platform 206 are not able to directly access components of the operating system 204 or hardware platform 202.

Figure 3:
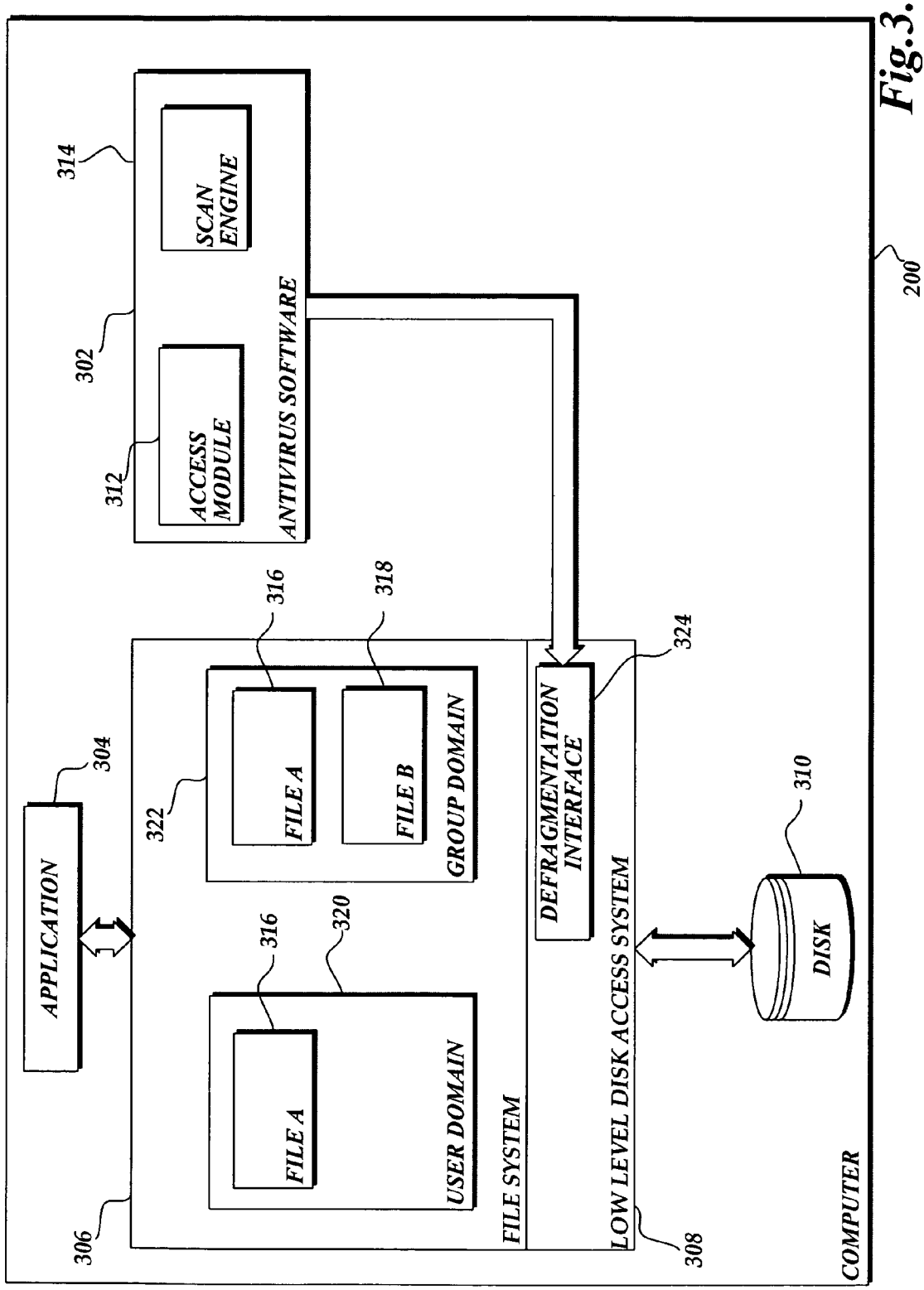
FIG. 3 is a block diagram illustrating components of a computer capable of scanning data in a file that maintains a restrictive access attribute, in accordance with the present invention.

Now with reference to FIG. 3, specific components of the computer 200 that are included in the hardware platform 202, the operating system 204, and the application platform 206 illustrated in FIG. 2 will be described. As illustrated in FIG. 3, the computer 200 includes antivirus software 302, an application 304, a file system 306, a low-level disk access system 308, and a disk 310. As further illustrated in FIG. 3, the antivirus software 302 includes an access module 312 and a scan engine 314. Moreover, the file system 306 includes "FILE A 316" and "FILE B 318" that may be included in either the "USER DOMAIN 320" or the "GROUP DOMAIN 322." Also, the low-level disk access system 308 includes a defragmentation interface 324 that may be accessed by the antivirus software 302.

Modern computers are configured to serve multiple users; each user having a different domain that defines the computer's resources that a user may access. In this type of system, a computer tracks which users have access to resources stored on the computer using Access Control Lists ("ACLs") or similar tracking system. This type of data tracking system allows users to share information while preventing unauthorized users from accessing the information. For purposes of the present application, the resources that a user may access are referred to as the user domain. Similarly, the resources that a group of users may access are referred to as a group domain. Thus, as illustrated in FIG. 3, a user associated with the "USER DOMAIN 320" may access "FILE A 318" and a group of users associated with the "GROUP DOMAIN 322" may access "FILE A 316" and "FILE B 318." However, a user who is not associated with these domains may not access these resources.

Those skilled in the art and others will recognize that computers do not treat all users equally. For example, some types of users are able to access critical databases, components, and data that are not available to other users. Typically, this type of user is referred to as an administrative or system user. Those skilled in the art will recognize that administrative or system users install programs such as antivirus software 302 on a computer in order to protect users of the computer from malware. Moreover, the antivirus software 302 may be installed with the same privileges as the user who installed the software. As described in further detail below, the antivirus software 302 may use these elevated privileges to circumvent access restrictions imposed on a file by malware authors.

A computer that supports multiple users, with each user having his or her own domain, employs access control and security mechanisms to prevent users of the computer 200 from accessing data that is outside of their domain. For example, in the context of FIG. 3, when the application 304 makes a request to the file system 306 to save a file on the disk 310, the file system 306 may encrypt the file data for storage on the disk 310. As a result, any unauthorized user who attempts to access the file directly from the disk 310 will only be able to obtain encrypted data. Without a key, the file cannot be decrypted, thereby limiting access of the file to authorized users. However, if an authorized user attempts to access the file, the file system uses a key associated with the user to decrypt the file.

Some malware authors use access control and security mechanisms provided by the file system 306 to prevent antivirus software 302 from scanning a file for malware. For example, as mentioned previously, a malware may use mechanisms available from the file system 306 to "lock" a file or otherwise restrict the ability of other users/programs to access the file. Similarly, a malware author may associate ACLs with the file that prevents users/programs that have elevated privileges from accessing the file. Moreover, since a malware author may use the file system 306 to encrypt malware when the malware is stored on the disk 310, existing antivirus software may not be able to effectively scan the file for malware.

As illustrated in FIG. 3, the computer 200 includes antivirus software 302 that is configured to identify malware, including malware in a file that maintains a restrictive access attribute. Since many components and functions of the antivirus software 302 are not important for an understanding of the present invention, they are not illustrated in FIG. 3 or described in the accompanying text.

With respect to the present invention, the antivirus software 302 includes an access module 312 that contains the software routines and logic implemented by the present invention. Since functions and different embodiments of the access module 312 are described below with reference to FIG. 4, a detailed description of the module 312 will not be provided here. However, generally described, the access module 312 implements logic to access a file that maintains a restrictive access attribute. Stated differently, if the antivirus software 302 issues a request to the file system 306 to read data from a file and the file system 306 responds to the request with an error message, the access module 312 identifies the restrictive access attribute that is limiting access to the file. Then, the module 312 bypasses the restrictive attribute and accesses data in the file for purposes of malware detection. For example, in one embodiment of the present invention, the access module 312 bypasses services provided by the file system 306 and directly accesses a file from the disk 310 using the defragmentation interface 324. As described in further detail below, the defragmentation interface 324 allows other software modules to identify the locations on the disk 310 where a file is stored. In one embodiment of the present invention, the access module 312 assembles the file using information available from the defragmentation interface 324 without employing services provided by the file system 306. When the file data is accessible, as a result of the functions performed by the access module 312, the file is scanned for malware.

As illustrated in FIG. 3, the antivirus software 302 includes a scan engine 314 configured to identify data characteristic of malware. Many different software vendors provide a scan engine or similar system that is configured to identify malware. One known technique employed by some existing scan engines that is used to identify malware includes obtaining a copy of the malware "in the wild." Then, the program code that implements the malware is processed with a hash function that converts the program code or a characteristic subset of the program code into a signature that uniquely identifies the malware. The scan engine 314 illustrated in FIG. 3 may employ this known technique of scanning data for a malware signature. Also, increasingly, heuristic techniques are being used to identify malware that may be used by the scan engine 314. However, it should be well understood that the examples described herein should be construed as exemplary and not limiting, as the antivirus software 302 may employ a number of existing or yet to be developed malware detection techniques.

Those skilled in the art and others will recognize that FIG. 3 is a simplified example of one computer 200 capable of the implementing aspects of the present invention. Actual embodiments of the computer 200 and components illustrated in FIG. 3 will have additional features not illustrated in FIG. 3 or described in the accompanying text. Also, FIG. 3 shows an exemplary component architecture for implementing aspects of the present invention. However, those skilled in the art and others will recognize that other component architectures are possible without departing from the scope of the present invention.

Now with reference to FIG. 4, an exemplary embodiment of the access module 312 illustrated in FIG. 3 that bypasses a restrictive access attribute imposed on a file so that the file may be scanned for malware will be described.

Figure 4:
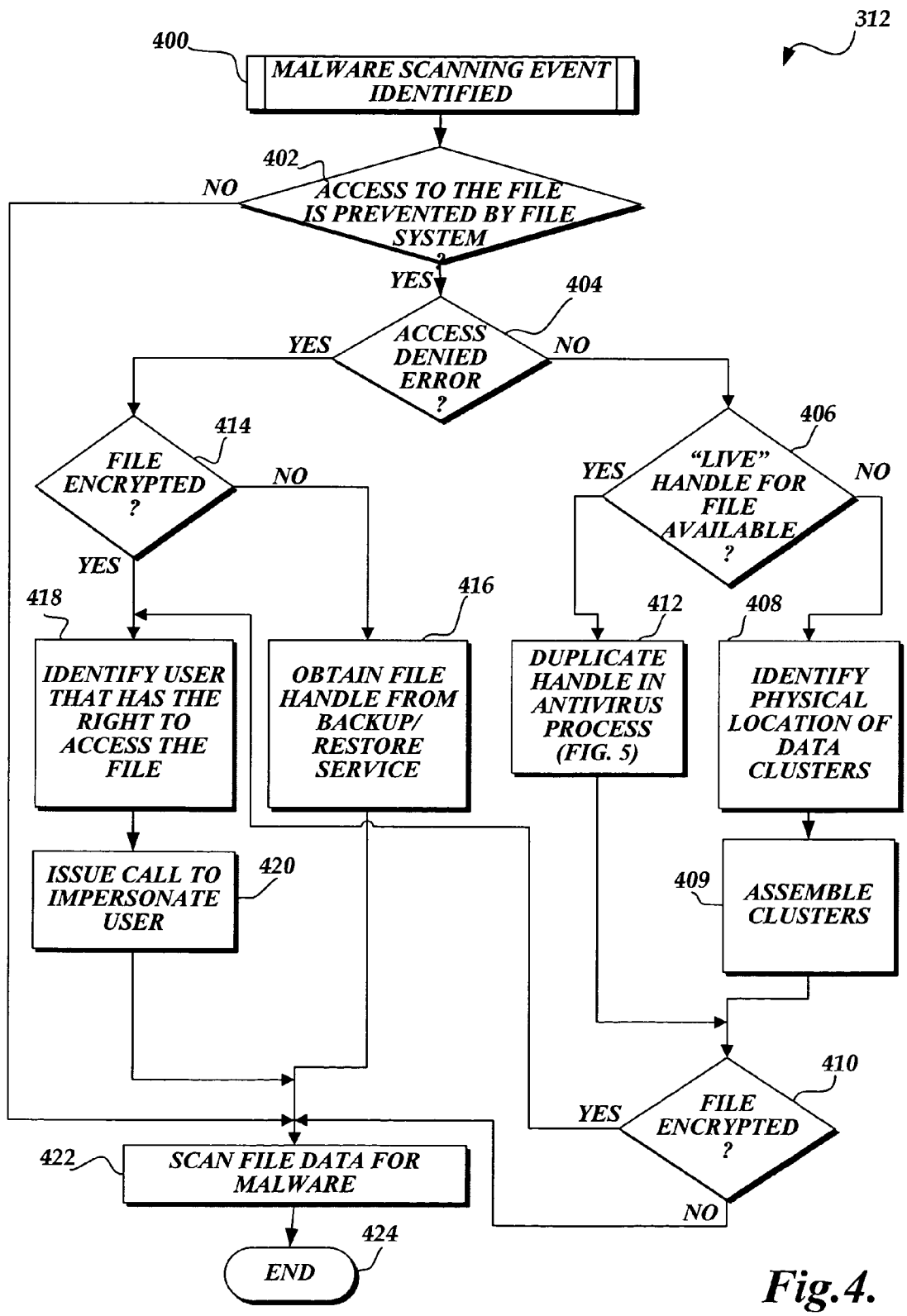
FIG. 4 is an exemplary flow diagram illustrating a method for scanning data in a file that maintains a restrictive access attribute, that is formed in accordance with the present invention.

As illustrated in FIG. 4, the access module 312 begins at block 400 where the occurrence of a malware scanning event is identified. As will be appreciated by those skilled in the art and others, antivirus software may scan a file for malware in many different instances. For example, a computer user may issue a command to start execution of a program by "double clicking" on an icon associated with the program. To prevent malware from being executed, antivirus software may cause one or more files associated with the program to be scanned "on access" before the program is loaded into memory and executed. Also, antivirus software may be configured to scan all of the files on a hardware device "on demand" in response to a user generated command. In this instance, files are sequentially selected and scanned. However, as known to those skilled in the art and others, the examples provided above should be construed as exemplary and not limiting, as one or more files may be scanned for malware in other contexts not described herein. Also, although the present invention will primarily be described in the context of performing a scan "on access," those skilled in the art and others will appreciate that the present invention is also applicable when other types of scanning events are identified.

At decision block 402, the access module 312 determines whether a restrictive access attribute is preventing antivirus software from accessing the file that is the object of the scanning event identified a block 400. Typically, when antivirus software is scheduled to scan a file for malware, data in the file is accessed using a publicly accessible interface provided by a file system. To access the file, antivirus software will issue one or more function calls to "open" the file. If the function call made by antivirus software to a file system results in the successful completion of the "open" operation, the access module 312 proceeds to block 422, described in further detail below. Conversely, if the attempt by antivirus software to "open" the file results in the interface generating an error message, the access module 312 proceeds to block 404.

At decision block 404, the access module 312 determines whether the error detected at block 402 was an "access denied" error. It will be appreciated by those skilled in the art that a file system generates different types of error messages when access to a file is not allowed. The exact error message generated depends on the restrictive access attribute that is preventing antivirus software from accessing the file. For example, if the file system stores a file in an encrypted state or the file is associated with an Access Control List that does not allow a program with elevated privileges to access the file, the file system will return an "access denied" error message. In this instance, the access module 312 proceeds to block 414 described below. Alternatively, the file system may generate an error message in which access to the file was not allowed as a result of a "sharing violation." This may occur, for example, a file is locked for exclusive use by malware. In this instance, the access module 312 proceeds to block 406.

As illustrated in FIG. 4, at block 406 the access module 312 determines whether a "live" handle for the file that is the object of the scanning event identified a block 400 is available. Those skilled in the art and others will recognize that most, if not all, file systems assign an identifier, commonly known as a handle, when a file is opened for modification. The file system uses the file handle internally to access the file and reassigns handles when a program issues a function call to close a file. An area of memory commonly known as a handle table, is reserved for storage of file handles that are open for modification on the computer. At block 406, the access module 312 determines whether a handle for the file that needs to be scanned for malware is available by searching the handle table. If a "live" handle for the file is identified, the access module 312 proceeds to block 412, described below. Alternatively, if a "live" handle for the file is not identified, the access module 312 proceeds to block 408.

At block 408, the access module 312 identifies the physical location(s) on a hardware device (e.g., disk 310) where the file that is the object of the scanning event identified at block 400 is stored. If block 408 is reached, a "live" handle that may be used to access the file is not available. In this instance, the access module 312 bypasses the services provided by a file system and directly accesses the file from the hardware device where the file is stored. In one embodiment of the present invention, the physical locations on the hardware device where the file is stored are identified at block 408, using a disk defragmentation system. Those skilled in the art and others will recognize that a file is stored on a hardware device in one or more data clusters (e.g., the atomic unit of data allocation). When a file is written to the hardware device, for a variety of reasons, the data may not be written in contiguous clusters. To optimize files for fast access, an existing system may "defragment" the hardware device where the data clusters are stored by moving the clusters so they are contiguous. In order to defragment the hardware device, a defragmentation system tracks the physical location of the data clusters that are associated with a file. In some operating systems, a defragmentation system provides an interface (e.g., defragmentation interface 324) from which other software systems may obtain the physical locations of the data clusters associated with a file. Thus, at block 408, the access module 312 may identify the physical locations of the file that is the object of the scanning event by issuing one or more function calls to an interface associated with a defragmentation system.

In an alternative embodiment of the present invention, the access module 312 identifies the physical location(s) where the file is stored on a hardware device at block 408 using a database maintained by an operating system. Those skilled in the art and others will recognize that each logical partition (e.g., volume) of a hardware device is associated with a database where information about files stored on the partition is tracked. For example, the Windows NT® File System ("NTFS") maintains a Master File Table ("MFT") that contains a record for each file on a volume. When a file is created, a new record for the file is generated in the MFT and a predetermined amount of space is allocated to store file attributes. Those skilled in the art and others will recognize that some of the file attributes maintained in the MFT are pointers to the physical location(s) where a file is stored. Thus the physical location(s) where the file is stored may be identified at block 408 by parsing information maintained in a database that stores file attributes.

As illustrated in FIG. 4 at block 409, the access module 312 causes data clusters associated with the file to be assembled together in a central location. When the physical locations of data clusters on the hardware device are known, assembling the data may be performed using methods that are generally known in the art. However, it should be well understood that, in this embodiment, the access module 312 bypasses the file system and directly accesses file data from a hardware device. Since restrictive access attributes are typically enforced by the file system, data obtained directly from the hardware device may be readily scanned for malware. Then the access module 312 proceeds to block 410, described in further detail below.

At decision block 410, the access module 312 determines whether the file that is the object of the scanning event identified a block 400 is encrypted. In one embodiment of the present invention, when a file is encrypted for storage on a hardware device, the file system associates a variable commonly known as an encryption bit with the file. Thus, the determination of whether the file is encrypted is made at block 410 by identifying the value of the encryption bit associated with the file. If the variable indicates that the file is encrypted, the access module 312 proceeds to block 418 described below. Alternatively, if the encryption bit indicates that the file is not encrypted, the access module 312 proceeds to block 422.

At block 412, the access module 312 creates a duplicate handle for the file that is the object of the scanning event identified a block 400. If block 412 is reached, a "live" handle for the file that will be scanned for malware was identified at block 406. In this instance, the access module 312 accesses file data by creating a duplicate file handle in a memory location that is available to antivirus software. After the file handle has been created, at block 412 the access module 312 proceeds to block 410, described above.

Figure 5:
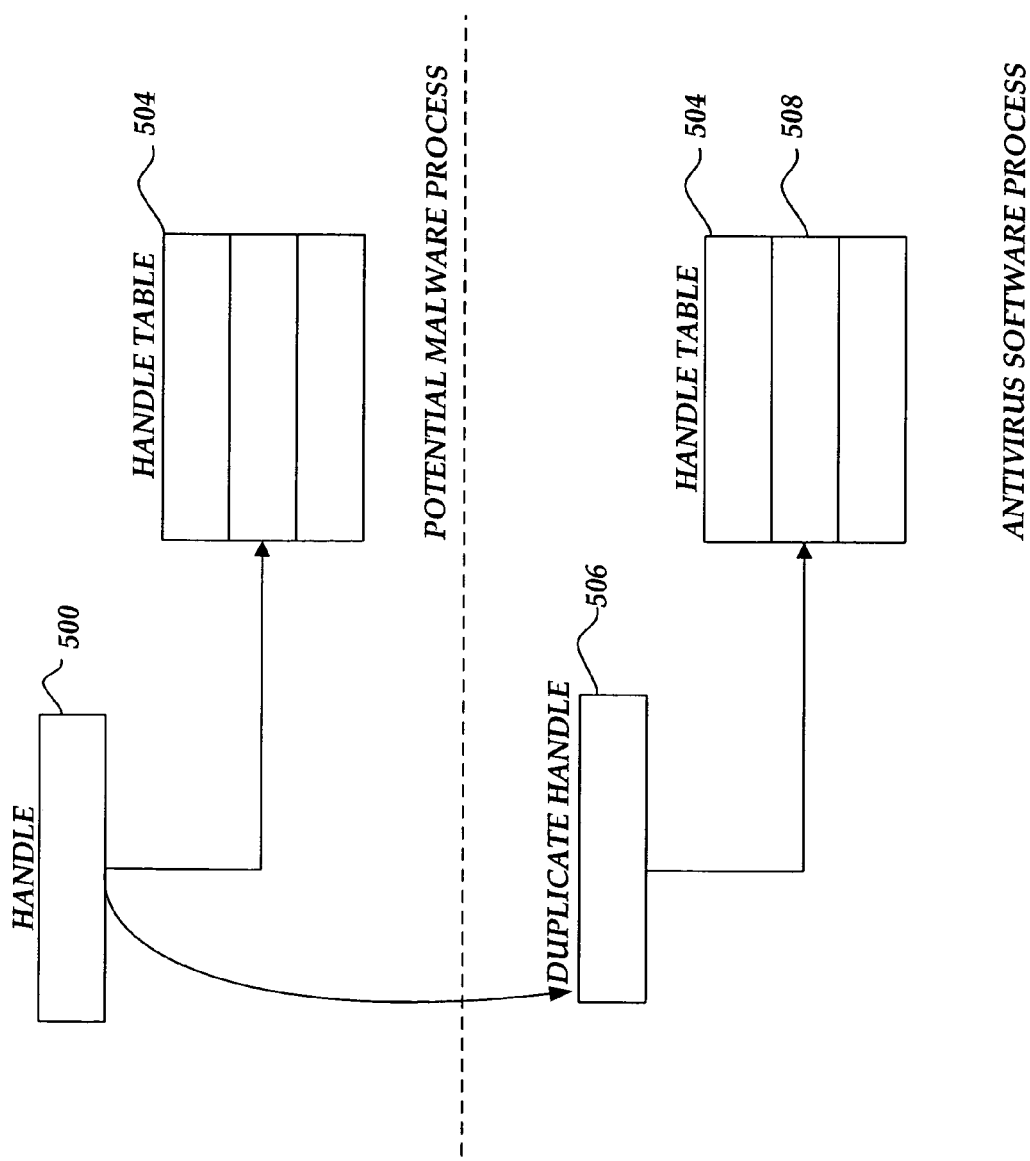
FIG. 5 is an exemplary block diagram illustrating a method for accessing a file with a restrictive access attribute using a duplicate file handle that is formed in accordance with the present invention.

For illustrative purposes and by way of example only, an exemplary technique for creating a duplicate file handle that may be used to access the file at block 412 is illustrated in FIG. 5. As depicted, FIG. 5 includes an open or "live" handle 500 that is associated with a process that may or may not be malware. The open or "live" handle 500 is a pointer to a memory location in a handle table 504 that is accessible to a potential malware process. However, in order for the file data to be accessible to antivirus software, a duplicate handle 506 for the file is created in an area of memory that is accessible to the antivirus software process. Those skilled in the art of others will recognize that, in this instance, an entry 508 for the duplicate handle 506 is added to a section of the handle table 504 that is associated with the antivirus software process. As a result, the antivirus software is able to use the duplicate handle 506 to access data from the file.

Returning to FIG. 4 at decision block 414, the access module 312 determines whether the file that is the object of the scanning event identified a block 400 is encrypted. As mentioned previously, in one embodiment of the present invention, when a file is encrypted for storage on a hardware device, the file system associates a variable commonly known as an encryption bit with the file. Thus, the determination of whether the file is encrypted is made at block 414 by identifying the value of the encryption bit associated with the file. If the variable indicates that the file is encrypted, the access module 312 proceeds to block 418 described below. Alternatively, if the encryption bit indicates that the file is not encrypted, the access module 312 proceeds to block 416.

At block 416, the access module 312 obtains a handle for the file that is the object of the scanning event, identified at block 400 from a backup/restore service. If block 416 is reached, the file is not encrypted and an attempt to access the file results in an access error. In this instance, the restrictive access attribute that is preventing antivirus software from accessing the file is embodied in the ACLs associated with the file. However, those skilled in the art and others will recognize that antivirus software that maintains elevated privileges may bypass restrictions embodied in ACLs. For example, programs with elevated privileges may access a backup/restore in order to bypass a file's ACLs and obtain a handle to access the file. Thus at block 416, the access module 312 obtains a handle for the file by issuing a function call to a backup/restore service.

As illustrated in FIG. 4 at block 418, the access module 312 identifies a user that has the right to access the file. If block 418 is reached, the file that will be scanned for malware was encrypted by the file system before being stored on a hardware device. In this instance, the access module 312 gains access to the file by "impersonating" a user that has the right to access the file. As mentioned previously, computers are increasingly configured to service multiple users, with each user being able to configure the computer to his or her own requirements. Moreover, file systems provide security services so that each user, or group of users, has a domain of resources that is not necessarily available to other users. In this regard, the file system may encrypt data before storing the data on a hardware device. To authenticate a user, modern operating systems typically provide "accounts" in which users log in to the computer. Internally, the data used to authenticate a user is maintained in an "access token." Among other things, an access token contains a key generated from a user's login information that is used to encrypt file data and thereby prevent unauthorized users from accessing the data. In any event, at block 418 the access module 312 identifies a user who has the right to access the file by enumerating through the login sessions that are active on the computer. The active login session associated with the file may be used to identify the user who has the right to access the file.

At block 420, the access module 312 issues a function call to the operating system in order to impersonate the user that is able to access the file. More specifically, the access token associated with the user identified at block 418 is obtained. Then the access module 312 issues a function call to the operating system in which the access token associated with the user is passed as a parameter. In the context of Windows® operating systems, the access module 312 may impersonate a user by issuing a call to the "ImpersonateLoginUser( )". As a result, the access module 312 has the same access rights as the impersonated user and is therefore able to access the file. While impersonating the user, the module 312 is able to open the file and cause file data to be decrypted in accordance with the prior art.

As illustrated in FIG. 4 at block 422, the access module 312 causes a scan of the file for malware to be performed. As mentioned previously, a known technique that may be employed to scan the file for malware includes obtaining a copy of the malware "in the wild." Then the program code that implements the malware is processed with a hash function that converts the program code or a characteristic subset of the program code into a signature that uniquely identifies the malware. At block 422, performing the scan includes searching the file for a signature that is associated with malware. However, it should be well understood that the example described herein should be construed as exemplary and not limiting, as the present invention may be used in conjunction with any number of malware detection techniques. Then, the access module 312 proceeds to block 424, where it terminates.

While the preferred embodiment of the invention has been illustrated and described, it will be appreciated that various changes can be made therein without departing from the spirit and scope of the invention.

The invention claimed is:

1. A method for scanning a file stored on a computer that has been infected by malware and that has restrictive access attributes that were set by the malware to prevent the file from being scanned, the method comprising:

attempting to scan a file on a computer with a malware scanner that has administrator privileges to access files on the computer;

receiving an indication that the file cannot be scanned because of one or more restrictive access attributes of the file that were set by malware that has infected the file, the one or more restrictive access attributes preventing the malware scanner from scanning the file because of the malware scanner's administrator privileges, wherein the one or more restrictive access attributes comprise at least one of the following:

the file being encrypted using a key that is associated with a particular user of the computer;

the file being associated with an access control list that does not allow a program with administrator privileges to access the file; or the file being locked for exclusive access by the malware;

bypassing the one or more restrictive access attributes to scan the file, wherein bypassing the one or more restrictive attributes comprises the following:

if the file is encrypted, impersonating the particular user to obtain the key to decrypt the file such that the file may be scanned;

if the file is associated with an access control list that does not allow a program with administrator privileges to access the file, bypassing the access control list by obtaining a handle to the file from a backup/restore service and using the handle to scan the file; or if the file is locked for exclusive access by the malware, determining whether the file is currently open such that if the file is currently open, the malware scanner obtains and uses a duplicate handle to scan the file, and such that if the file is not currently open, the malware scanner obtains the file directly from a hardware device where the file is stored without using file system services provided by an operating system by identifying physical locations on the hardware device where data clusters associated with the file are stored by parsing a database maintained by the operating system that tracks file attributes; and scanning the file to identify the malware.

2. The method as recited in claim 1, wherein receiving an indication that the file cannot be scanned comprises receiving an error message.

3. The method as recited in claim 1, wherein the key is included in an access token associated with the particular user and wherein impersonating the particular user to obtain the key to decrypt the file such that the file may be scanned comprises:

obtaining the access token associated with the particular user; and issuing a function call to the operating system installed on the computer where the access token associated with the user is located.

4. The method as recited in claim 1, wherein determining whether the file is currently open comprises searching a table that tracks all open files on the computer.

5. The method as recited in claim 1, wherein obtaining the file from the hardware device where the file is stored includes identifying data clusters associated with the file using a defragmentation interface.

6. The method as recited in claim 1, wherein obtaining the data in the file from the hardware device where the file is stored further includes:
  (a) determining whether the data clusters are encrypted; and
  (b) if the data clusters are encrypted, obtaining the access rights of a user who can access the data clusters and using the access rights for accessing the data clusters.

7. A computer-readable storage medium storing computer executable instructions, which when executed by a processor, perform a method for scanning a file stored on a computer that has been infected by malware and that has restrictive access attributes that were set by the malware to prevent the file from being scanned, the method comprising:
  attempting to scan a file on a computer with a malware scanner that has administrator privileges to access files on the computer;
  receiving an indication that the file cannot be scanned because of one or more restrictive access attributes of the file that were set by malware that has infected the file, the one or more restrictive access attributes preventing the malware scanner from scanning the file because of the malware scanner's administrator privileges, wherein the one or more restrictive access attributes comprise at least one of the following:
    the file being encrypted using a key that is associated with a particular user of the computer;
    the file being associated with an access control list that does not allow a program with administrator privileges to access the file; or
    the file being locked for exclusive access by the malware;
  bypassing the one or more restrictive access attributes to scan the file, wherein bypassing the one or more restrictive attributes comprises the following:
    if the file is encrypted, impersonating the particular user to obtain the key to decrypt the file such that the file may be scanned;
    if the file is associated with an access control list that does not allow a program with administrator privileges to access the file, bypassing the access control list by obtaining a handle to the file from a backup/restore service and using the handle to scan the file; or
    if the file is locked for exclusive access by the malware, determining whether the file is currently open such that if the file is currently open, the malware scanner obtains and uses a duplicate handle to scan the file, and such that if the file is not currently open, the malware scanner obtains the file directly from a hardware device where the file is stored without using file system services provided by an operating system by identifying physical locations on the hardware device where data clusters associated with the file are stored by parsing a database maintained by the operating system that tracks file attributes; and
  scanning the file to identify the malware.

8. The computer-readable storage medium as recited in claim 7, wherein receiving an indication that the file cannot be scanned comprises receiving an error message.

9. The computer-readable storage medium as recited in claim 7, wherein the key is included in an access token associated with the particular user and wherein impersonating the particular user to obtain the key to decrypt the file such that the file may be scanned comprises: obtaining the access token associated with the particular user; and
  issuing a function call to the operating system installed on the computer where the access token associated with the user is located.

10. The computer-readable storage medium as recited in claim 7, wherein determining whether the file is currently open searching a table that tracks open files on the computer.

11. The computer-readable storage medium as recited in claim 7, wherein obtaining the file from the hardware device where the file is stored includes identifying data clusters associated with the file using a defragmentation interface.

12. The computer-readable storage medium as recited in claim 7, the data in the file from the hardware device where the file is stored further includes:
  (a) determining whether the data clusters are encrypted; and
  (b) if the data clusters are encrypted, obtaining the access rights of a user who can access the data clusters and using the access rights for accessing the data clusters.

13. A computing device comprising a processor configured to execute instructions in memory to perform a method for scanning a file stored on the computing device that has been infected by malware and that has restrictive access attributes that were set by the malware to prevent the file from being scanned, the method comprising:
  attempting to scan a file on the computing device with a malware scanner that has administrator privileges to access files on the computing device;
  receiving an indication that the file cannot be scanned because of one or more restrictive access attributes of the file that were set by malware that has infected the file, the one or more restrictive access attributes preventing the malware scanner from scanning the file because of the malware scanner's administrator privileges, wherein the one or more restrictive access attributes comprise at least one of the following:
    the file being encrypted using a key that is associated with a particular user of the computing device;
    the file being associated with an access control list that does not allow a program with administrator privileges to access the file; or
    the file being locked for exclusive access by the malware;
  bypassing the one or more restrictive access attributes to scan the file, wherein bypassing the one or more restrictive attributes comprises the following:
    if the file is encrypted, impersonating the particular user to obtain the key to decrypt the file such that the file may be scanned;
    if the file is associated with an access control list that does not allow a program with administrator privileges to access the file, bypassing the access control list by obtaining a handle to the file from a backup/restore service and using the handle to scan the file; or
    if the file is locked for exclusive access by the malware, determining whether the file is currently open such that if the file is currently open, the malware scanner obtains and uses a duplicate handle to scan the file, and such that if the file is not currently open, the malware scanner obtains the file directly from a hardware device where the file is stored without using file system services provided by an operating system by identifying physical locations on the hardware device where data clusters associated with the file are stored by parsing a database maintained by the operating system that tracks file attributes; and scanning the file to identify the malware.

14. The computing device as recited in claim 13, wherein obtaining the file directly from the hardware device comprises accessing a low-level access system component that is communicatively connected to the hardware device to obtain the file.

15. The computing device as recited in claim 14, wherein the low-level access system component maintains a defragmentation interface to identify locations on the hardware device component where data clusters comprising the file are stored; and wherein the file is obtained by querying the defragmentation interface to bypass the one or more restrictive access attributes.

* * * * *